BACILLUS THURINGIENSIS SPORE PESTICIDE

Filed Jan. 3, 1961

| LEGEND | | |
|---|---|---|
| | PLOT | COMPOSITION |
| △ | A | UNSPRAYED |
| ◇ | B | B |
| ○ | C | A |
| ● | D | A |
| □ | E | C |
| ■ | F | C |

LIVE TOBACCO HORNWORMS (PER 50 PLANTS)

BACILLUS THURINGIENSIS (GRAMS/ACRE)

Robert E. Emond  INVENTOR

BY Frank T. Johmann

PATENT ATTORNEY

United States Patent Office 3,113,066
Patented Dec. 3, 1963

3,113,066
*BACILLUS THURINGIENSIS* SPORE PESTICIDE

Robert E. Emond, Mooretown, Ontario, Canada, assignor to Esso Research and Engineering Company, a corporation of Delaware Filed Jan. 3, 1961, Ser. No. 80,178
4 Claims. (Cl. 167—13)

This invention relates to novel oil compositions and a method of controlling pests. More specifically, this invention relates to an improvement in the method of controlling lepidopterous insects.

It has been appreciated by the art that various oils including petroleum base oils, animal oils, vegetable oils and the like are useful as insecticides. More recently the art has become aware of the fact that oils applied to plants also have value as fungicides. For instance, U.S. Patent 2,951,785 discloses oil compositions having value in controlling the Sigatoka fungus disease of banana plants as well as peach canker disease, apple scab, American leaf spot and others.

Although the oils are effective against many fungus diseases and other pests, they are not very toxic towards lepidopterous insects. In many areas where effective pest control necessitates control of both fungus disease and the lepidopterous insects, the present invention represents an effective means of achieving this control. The banana plant represents an excellent illustration of the problem. The application of oil controls Sigatoka disease but has little toxic effects against lepidopterous insects.

The present technique of controlling both the insects and the fungus is to incorporate various chemical insecticides into the oil. The most effective of these are the chlorinated ones such as DDT, Endrin, heptachlor and the like. This technique is unsatisfactory from two aspects. The first is that the chemicals which are effective as insecticides create a serious plant toxicity problem. That is leaf burning, reduced yields, premature leaf dropping, and the like, can occur. The second is that these chemicals create a problem by building up residues on edible foods which residues are toxic to human beings. Clearly, either one of these aspects is undesirable.

It has also been known in the art that *Bacillus thuringiensis* (*B.t.*) is a moderately effective bacterial insecticide against Lepidoptera when in an aqueous dispersion medium. The present invention resides in the discovery that the combination of a pesticidal oil and *Bacillus thuringiensis* is unexpectedly much more effective towards lepidopterous insects, than either the oil the *B.t.* in an aqueous medium.

The increased effectiveness of oil plus *B.t.* effectively solves the problems of toxicity and the relative noneffectiveness of the oil towards lepidopterous insects. Additionally, the use of an oil dispersing medium is of great value for crops in areas when the rainfall is so high as to make treatment with *Bacillus thuringiensis* in an aqueous medium ineffective.

*Bacillus thuringiensis* is a spore forming bacteria. In the preferred form of the invention the spores themselves are used as the insecticide which is added to the oil.

Lepidopterous insects are that order of insects which consists of the butterflies and moths. The larva are wormlike and are commonly called caterpillars. These larva have well-developed mandibles and feed mainly on leaves, in many instances doing great damage to vegetation. The order has more than 120,000 species. Common examples are the tobacco hornworm, tomato hornworm, cabbage looper, army worm, cutworm, alfalfa caterpillar, artichoke, plimer moth, celery leaf tier, Gypsy moth, Wallnut caterpillar, and the like.

In general, all, oils known to the art as pesticides are operable in the invention. Pesticide as used herein denotes the capability of killing insects and other anthropods, weeds and fungi. More specifically, the oils will have a viscosity of from 30 to 300, e.g., 40 to 250 SUS at 100° F. Preferably, the viscosity is from 40 to 120 SUS at 100° F. so as to be more easily applied as a mist. As aromatics content is a major cause of phytotoxicity, the aromatic content should be below 25 wt. percent and preferably below 18 wt. percent. The aromatics content of a hydrocarbon oil can be lowered by various well-known processes such as sulfuric acid treatment, phenol extraction and the like. It is also preferred that the olefinic content be kept below about 4 wt. percent. Larger quantities of olefinic components have a greater tendency to oxidize rapidly to organic acids which are capable of serious plant damage. The total quantity of unsulphonatable residue should be at least 50 wt. percent and preferably as much as 99 wt. percent. The higher unsulphonatable residue percentage in the oil, the less likely it is to cause damage to the plant.

The preferred method of control is to select an oil medium capable of being dispersed as a fine mist. Suitable misting equipment is exemplified by the Solo Port Knapsac Sprayer manufactured by Kent Engineering of Tovil, Maidstone, England. Spraying from aircraft is also suitable. This type of misting equipment utilizes high air velocities to disperse the oil compositions as a fine mist. In this manner it is possible to obtain good coverage at rates as small as 1 quart to 15 imperial gallons per acre as compared with about 300 imperial gallons per acre for emulsions with conventional sprayers. The composition of the invention is preferably used on insects during their larval stage which is the destructive one. However, it may be desirable, in some instances, to control the insect at other stages. One such instance would be to prevent future breeding.

Although the primary use of the oil and *B.t.* composition of the invention is against lepidopterous insects on plants, it can be used in other situations. For instance, it is sometimes desirable to control the insects that are on the group surrounding the plants. Lepidopterous insects such as army worms sometimes congregate in great numbers at places like airports where they can be a severe hazard. The composition can be used advantageously in the above situation and in similar instances as well as for pests attacking wooded areas, spruce and oak trees, for example.

In general, the quantity of *Bacillus thuringiensis* spores to be dispersed in the carrier oil is in the range of from 0.1 to 500, preferably from 20 to 180 grams per imperial gallon. Each gram contains approximately 75 billion spores of *B.t.* For effective control of lepidopterous insects mists containing a *Bacillus thuringiensis* in the above concentrations are applied at a rate of from 1 qt. to 15, e.g. 1 to 5 gal. (imp.) per acre. This application can be repeated as many times as necessary. In many instances the toxic effect of the oil itself against pests will be desired and application of the oil to obtain its own unique effect may be desirable.

It is to be understood that the invention does not exclude the use of additives which provide additional beneficial results beyond those effected by the oil and *Bacillus thuringiensis* composition per se. Suitable additives include oxidation inhibitors, oil thickeners, plant hormones, light absorbers and other compatible pesticides if desired.

The invention is further illustrated but not limited by the following examples. All gallons are imperial gallons.

EXAMPLE I

An oil suitable for misting was used to prepare several compositions. It was obtained from a Western Canadian paraffinic distillate which was phenol treated, dewaxed and hydro finished. The specifications of this oil were as follows:

| | |
|---|---|
| Viscosity at 100° F. SUS | 90 |
| Aromatics, wt. percent | 14.9 |
| Paraffins, wt. percent | 18.7 |
| Naphthenes, wt. percent | 66.4 |
| Unsulphonatable residue, wt. percent | 92.0 |

*Composition A.*—Composition A was prepared from the above-described oil and *Bacillus thuringiensis* by blending together the oil and *B.t.* at the rate of ¼ pound of *B.t.* per 1.5 imperial gallons of oil. The *B.t.* was obtained from the Rohm and Haas Co. of Canada Limited. A gram of *B.t.* contained approximately 75 billion spores.

*Composition B.*—This composition was similar to composition A except no *Bacillus thuringiensis* was added.

*Composition C.*—This composition was prepared exactly like composition A but the *B.t.* was blended in an aqueous medium instead of an oil medium.

*Composition D.*—Composition D was prepared exactly like composition A except that ½ pound of *B.t.* per 1.5 imperial gallons were used.

EXAMPLE II

The compositions of Example I were tested by spraying them on tobacco plants infested with tobacco hornworms. Each composition tested was sprayed on a plot consisting of two rows of plants having approximately 300 plants. The spraying equipment used was the Solo Port Knapsac Sprayer. These plots were labeled plots A through F. Plot A was not sprayed and thus used as a control.

Plot B was sprayed with composition B at a rate of approximately 1.5 gallons per acre.

Plot C was sprayed with composition A at a rate sufficient to deposit approximately 120 grams of *Bacillus thuringiensis* per acre.

Plot D was sprayed with composition A at a rate sufficient to deposit approximately 230 grams of *B.t.* per acre.

Plot E was sprayed with composition C at a rate sufficient to deposit approximately 150 grams of *B.t.* per acre.

Plot F was sprayed with composition C at a rate sufficient to deposit approximately 300 grams of *B.t.* per acre.

About two weeks after each plot was sprayed all the sprayed plots and unsprayed plot A were examined and a count of live hornworms present per 50 plants was made. The count revealed that on unsprayed plot A there were approximately 65 hornworms per every 50 plants; on plot B there were approximately 22 hornworms per 50 plants; on plots C and D there were approximately 2 hornworms per every 50 plants. On plot E there were about 15 hornworms per every 50 plants and on plot F there were approximately 9 hornworms per every 50 plants. The tobacco hornworms have instar stages from the larva form to the imago form of approximately 3–5 weeks. The sprays were applied to the plants at a time corresponding to the beginning of the larva form of the insects present. The observation time two weeks later represents a point where the insects had attained a full growth in the larva form in which form they are most destructive. The results of these sprays are summarized in the following table and the attached drawing.

*Table I*

| Plot | Spray Composition | *B.t.* gms./acre | Tobacco Hornworms/ 50 Plants |
|---|---|---|---|
| A | None | | 65 |
| B | B | | 22 |
| C | A | 120 | 2 |
| D | A | 230 | 2 |
| E | C | 150 | 15 |
| F | C | 300 | 9 |

It is apparent from the above results that while the oil alone is somewhat effective, the combination of oil and *B.t.* is much more effective than either the oil alone or the aqueous dispersion of *B.t.*

EXAMPLE III

In order to further illustrate the invention, plots H and I were sprayed using the same apparatus as in Example II. The plots were the same type as those of Example I. Also, the insects were in approximately the same stage of growth. Plot H was sprayed with composition B at a rate of about 1.5 gallons per acre. Plot I was sprayed at a rate of about 1.5 gals. per acre with composition A. Plot G was used as the control and was not sprayed. Approximately a week after the sprayings the plots were examined to ascertain the number of insects still alive per 50 plants. On plot H it was found that approximately 23.3 insects per 50 plants were alive. On plot I it was found that there were no insects alive per 50 plants; and on the control plot G it was found that there were 40 insects alive per 50 plants. The plots were again inspected approximately one week later. In the latter inspection it was found that on plot H there were approximately 11.6 insects per 50 plants alive and on plot I it was found that there were approximately 1.6 insects alive per 50 plants. On the control plot G there were approximately 28 insects alive per 50 plants. None of the plants showed any sign of leaf burn or plant toxicity. The results of the above evaluations are summarized in the following table.

*Table II*

| Plot | Spray Composition | Tobacco Hornworms/ 50 Plants, 1st Observation | Tobacco Hornworms/ 50 Plants, 2nd Observation |
|---|---|---|---|
| G | | 41 | 28 |
| H | B | 23.3 | 11.6 |
| I | A | 0 | 1.6 |

These results clearly demonstrate that many more hornworms were killed using the composition of the invention compared with the number killed using oil alone.

EXAMPLE IV

In order to further illustrate the invention the compositions of Example I were evaluated with respect to the percent of plant damage. For this evaluation plots J through N containing approximately 210–230 tobacco plants per plot were sprayed with the same apparatus described in Example II. Plots J and K were sprayed with composition B at the rate of approximately 1.5 gallons per acre. Plot L was sprayed with composition A at the rate of approximately 1.5 gallons per acre. Plots M and N were sprayed with composition D at the rate of approximately 1.5 gallons per acre. Prior to the spraying a count was taken of the insects in plots J–N and it was found that about 75% of the plants had at least 15 insects per 50 plants. Approximately two weeks after the spray applications described, the plants were examined to determine how much damage had been caused by insects. It was found that in plot J approximately 71% of the plants had suffered damage. It was found in plot K that approximately 77% of the plants had suffered damage. In plot L only 27% of the plants had been damaged and in plots M and N only 24% of the plants had been damaged. These results are summarized in the following table.

*Table III*

| Plot | Spray Composition | Percent Plants Damaged by Insects |
|------|-------------------|-----------------------------------|
| J    | B                 | 71                                |
| K    | B                 | 77                                |
| L    | A                 | 27                                |
| M    | D                 | 24                                |
| N    | D                 | 24                                |

These results clearly demonstrate that much more plant damage occurs using the oil as compared with the composition of the invention.

What is claimed is:

1. A composition useful as a pesticide for lepidopterous insects comprising a major proportion of a mineral oil having a viscosity of about 40 to 120 SUS. at 100° F., an aromatic content below 25 wt. percent, an olefinic content less than about 4 wt. percent, and a total quantity of unsulphonatable residue of at least 50 wt. percent, and dispersed within said oil about 20 to $120 \times 75 \times 10^9$ *Bacillus thuringiensis* spores per imperial gallon of said mineral oil.

2. A pesticide composition for lepidopterous insects comprising a major amount of a mineral oil having a viscosity of about 90 SUS at 100° F. consisting essentially of about 14.9 wt. percent aromatics, 18.7 wt. percent paraffins and 66.4 wt. percent naphthenes, said oil having an unsulphonatable residue of 92 wt. percent, and about ¼ to ½ of a pound, per 1.5 imperial gallon of said oil, of a *Bacillus thuringiensis* spore composition containing approximately 75 billion of said spores per gram.

3. A method of controlling lepidopterous insects on vegetation which comprises spraying said vegetation with about 1 quart to 15 imperial gallons per acre of a mineral oil having a viscosity within the range of about 30 to 300 SUS at 100° F., said oil having an aromatic content below 25 wt. percent, an olefinic content below about 4 wt. percent, and a total quantity of unsulphonatable residue of at least 50 wt. percent, and dispersed in said oil a synergistic amount of *Bacillus thuringiensis* spores within the range of about 0.1 to $500 \times 75 \times 10^9$ *Bacillus thuringiensis* spores per imperial gallon of said oil.

4. A method according to claim 3, wherein said vegetation is tobacco plants and said insects are tobacco hornworms.

References Cited in the file of this patent

Washington Daily News, April 7, 1959, page 3.
Frear: Chemistry of Insecticides, Fungicides and Herbicides, 2nd ed., 1948, pp. 189–202.
C. and E. News 36, issue 51, Dec. 22, 1958 (p. 15).
Science, 129, No. 3348, Feb. 27, 1959 (pp. 537–544).
Jour. Gen. Microb., 21 (1959), pp. 96–108.